(12) United States Patent
Grøtli et al.

(10) Patent No.: US 6,642,334 B2
(45) Date of Patent: Nov. 4, 2003

(54) BEADED POLYETHYLENE GLYCOL-BASED RESINS

(75) Inventors: Morten Grøtli, Oslo (NO); Morten Peter Meldal, Frederiksberg (DK)

(73) Assignee: Carlsberg A/S (DK)

( * ) Notice: Subject to any disclaimer, the term of this patent is extended or adjusted under 35 U.S.C. 154(b) by 196 days.

(21) Appl. No.: 09/901,343

(22) Filed: Jul. 9, 2001

(65) Prior Publication Data

US 2003/0050415 A1 Mar. 13, 2003

(51) Int. Cl.$^7$ .................... C08F 130/08; C08F 120/10; C08F 220/68
(52) U.S. Cl. .................... 526/279; 526/317.1; 526/318; 526/320; 526/332; 526/930; 526/936
(58) Field of Search .............................. 526/279, 317.1, 526/318, 320, 332, 930, 936

(56) References Cited

U.S. PATENT DOCUMENTS

| | | | |
|---|---|---|---|
| 4,908,405 A | | 3/1990 | Bayer et al. |
| 5,656,707 A | | 8/1997 | Kempe et al. |
| 5,910,554 A | * | 6/1999 | Kempe et al. .............. 526/320 |
| 5,917,015 A | * | 6/1999 | Jensen et al. .............. 530/334 |

FOREIGN PATENT DOCUMENTS

WO     WO01/23039 A1     4/2001

OTHER PUBLICATIONS

Meldal et al., A Chemically Inert Hydrophillic Resin for Solid Phase Organic Synthesis, Tetrahedron Letters 39 (1998) 8695–8698.*

Adams, J. et al., "A Reinvestigation of the Preparation, Properties, and Applications of Aminomethyl and 4–Methylbenzhydrylamine Polystyrene Resins", *J. Org. Chem.,* vol. 63, No. 11, pp. 3706–3716 (May 29, 1998).

Auzanneau, F. et al., "Synthesis, Characterization and Biocompatibility of PEGA Resins", *Jrl. of Peptide Science,* vol. 1, pp. 31–44 (1995).

Becker, H. et al., "Polyethyleneglycols Grafted onto Crosslinked Polystyrenes: A New Class of Hydrophilic Polymeric Supports for Peptide Synthesis", *Makromol. Chem.,* vol. 3, pp. 217–223 (1982).

Buchardt, J. et al., "A Chemically Inert Hydrophilic Resin for Solid Phase Organic Synthesis", *Tetrahedron Letters,* vol. 39, No. 47, pp. 8695–8698 (1998).

Burger, M. et al., "Enzymatic, Polymer–Supported Formation of an Analog of the Trypsin Inhibitor A90720A: A Screening Strategy for Macrocyclic Peptidase Inhibitors", *J. Am. Chem. Soc.,* vol. 119, No. 51, pp. 12697–12698 (Dec. 24, 1997).

(List continued on next page.)

*Primary Examiner*—Robert D. Harlan
(74) *Attorney, Agent, or Firm*—Merchant & Gould P.C.

(57) ABSTRACT

Described herein is a pentaalkyldisiloxane containing polymeric surfactant prepared by the copolymerization of an alkoxypolyoxyalkylenyl acrylate and an acrylate containing a pentaalkyldisiloxane group. A method for preparing beaded polyethylene glycol-based resins in silicone oil in the presence of a polymeric surfactant containing a pentaalkyldisiloxane group is also described. The average bead size can be controlled by varying the stirring rate, the polymerization temperature, the amount of surfactant, the type of solvent, and the amount of solvent. The surfactant does not interfere with the polymerization and can be removed together with residual silicone oil by a simple washing procedure. The resins can be used, for example, as a support for solid phase organic synthesis, as a chromatographic resin, as a resin for solid phase MAS-NMR spectroscopy, and as a carrier for drug molecules, various reagents, or scavengers.

27 Claims, 1 Drawing Sheet

OTHER PUBLICATIONS

Cilli, E. et al., "Correlation between Solvation of Peptide-Resins and Solvent Properties", *J. Org. Chem.*, vol. 61, No. 25, pp. 8992–9000 (Dec. 13, 1996).

Gotfredsen, C. et al., "Single–bead structure elucidation. Requirements for analysis of combinatorial solid–phase libraries by Nanoprobe MAS–NMR spectroscopy", *J. Chem. Soc., Perkin Trans. 1*, pp. 1167–1171 (2000).

Graven, A. et al., "Towards peptide isotere libraries: aqueous aldol reactions on hydrophilic solid supports", *J. Chem. Soc., Perkin Trans 1.*, pp. 955–962 (2000).

Grotli, M. et al., "Physical Properties of Poly(ethylene glycol) (PEG)—Based Resins for Combinatorial Solid Phase Organic Chemistry: A Comparison of PEG–Cross–Linked and PEG–Grafted Resins", *J. Comb. Chem.*, vol. 2, No. 2, pp. 108–119 (Mar./Apr. 2000).

Hellermann, H. et al., "Poly(ethylene glycol)s Grafted onto Crosslinked Polystyrenes, 2). Multidetachably Anchored Polymer Systems for the Synthesis of Solubilized Peptides", *Makromol. Chem.*, pp. 2603–2617 (1983).

Itsuno, S. et al., "New Solid–Phase Catalysts for Asymmetric Synthesis: Cross–Linked Polymers Containing a Chiral ShiffBase–Zinc Complex", *J. Org. Chem.*, vol. 55, No. 1, pp. 304–310 (1990).

Kanda, P. et al., "Synthesis of polyamide supports for use in peptide synthesis and as peptide–resin conjugates for antibody production", *Int. J. Peptide Protein Res.*, vol. 38, No. 4, pp. 385–391 (Oct. 1991).

Leon, S. et al., "Evaluation of Resins for on—bead Screening:: A Study of Papain and Chymotrypsin Specificity Using PEGA–Bound Combinatorial Peptide Libraries", *Bioorganic & Medicinal Chemistry Letters*, vol. 8, pp. 2997–3002 (1998).

Mayes, A. et al., "Molecularly Imprinted Polymer Beads: Suspension Polymerization Using a Liquid Perfluorocarbon as the Dispersing Phase", *Anal. Chem.*, vol. 68, No. 21, pp. 3769–3774 (Nov. 1, 1996).

Munzer, M. et al., "5. Polymerizations in Suspension", *Polymerization Processes*, vol. 29, pp. 106–142 (1977).

Porco, J., Jr. et al., "Automated chemical synthesis: From resins to instruments", *Molecular Diversity*, vol. 2, No. 4, pp. 197–206 (Apr. 1997).

Pursch, M. et al., "Monitoring the Reaction Progress in Combinatorial Chemistry: H MAS NMR Investigations on Single Macro Beads in the Suspended State", *Angew. Chem. Int. Ed. Engl.*, vol. 35, No. 23/24, pp. 2867–2869 (Jan. 3, 1997).

Rademann, J. et al., "SPOCC: A Resin for Solid–Phase Organic Chemistry and Enzymatic Reactions on Soild Phase", *J. Am. Chem. Soc.*, vol. 121, No. 23, pp. 5459–5466 (Jun. 16, 1999).

Rademann, J. et al., "Solid–Phase Synthesis of Peptide Isosters by Nucleophilic Reactions with N–Terminal Peptide Aldehydes on a Polar Support Tailored for Solid–Phase Organic Chemistry", *Chem. Eur. J.*, vol. 5, No. 4, pp. 1218–1225 (1999).

Rapp, W. et al., "Polystyrene–Polyoxyethylene Graftcopolymers for High Speed Peptide Synthesis", *Peptides 1988—Proceedings of the 20th European Peptide Symposium*, pp. 199–201 (Sep. 4–9, 1988).

Renil, M. et al., "POEPOP and POEPS: Inert Polyethylene Glycol Crosslinked Polymeric Supports for Solid Synthesis", *Tetrahedron Letters*, vol. 37, No. 34, pp. 6185–6188 (1996).

Sarkar, S. et al., "An NMR Method to Identify Nondestructively Chemical Compounds Bound to a Single Solid–Phase–Synthesis Bead for Combinatorial Chemistry Applications", *J. Am. Chem. Soc.*, vol. 118, No. 9, pp. 2305–2306 (Mar. 6, 1996).

Schleyer, A. et al., "Direct Solid–Phase Glycosylations of Peptide Templates on a Novel PEG–Based Resin", *Angew. Chem. Int. Ed. Engl.*, vol. 36, No. 18, pp. 1976–1978 (1997).

Smith, H. et al., "Comparison of Resin and Solution Screening Methodologies in Combinatorial Chemistry and the Identification of a 100 nM Inhibitor of Trypanothione Reductase", *J. Comb. Chem.*, vol. 1, No. 4, pp. 326–332 (Jul./Aug. 1999).

Wilson, M. et al., "Solvent and Reagent Accessibility within Oligo(ethylene glycol) Ether [PEG] Cross–Linked Polystyrene Beads", *J. Org. Chem.*, vol. 63, pp. 5094–5099 (1998).

\* cited by examiner

BEADED POLYETHYLENE GLYCOL-BASED RESINS

FIELD OF THE INVENTION

The invention relates to beaded polyethylene glycol-based resins prepared in silicone oil using a polymeric surfactant containing a pentaalkyldisiloxane group. The invention also relates to the pentaalkyldisiloxane containing surfactant.

BACKGROUND OF THE INVENTION

The recent renaissance of solid phase organic chemistry for synthesis of various molecules has created an increasing demand for new solid supports. Traditionally, polystyrene-divinylbenzene (PS-DVB) has been used as a support for solid phase chemistry because of its high thermal stability, chemical inertness, and mechanical robustness. However, the limited swelling of PS-DVB supports in polar media can limit reagent accessibility and prevent chemical applications in which complete solvation of the polymer matrix is essential for reactivity. For example, the poor swelling of conventional PS-DVB in polar solvents such as an aqueous buffer results in limited diffusion of reagents and low yields for reactions performed in these media. Although increased swelling in polar solvents can be achieved by grafting polyethylene glycol (PEG) to chloromethylated PS-DVB, the resulting PEG-grafted PS-DVB supports such as Tenta-Gel™ (Rapp Polymere GmbH; Tübingen, Germany) and ArgoGel™ (Argonault Technologies; San Carlos, Calif.) have limitations for use in aqueous solvents and for enzymatic chemistry.

Several PEG-based resins have been developed recently that exhibit high swelling volumes in both nonpolar solvents and water. These resins include, for example, polyoxyethylene-polyoxypropylene (POEPOP), SPOCC (Superior Polymer for Organic Combinatorial Chemistry, a polymer formed by cationic polymerization of a mixture of mono- and bis-oxetanylated PEG macromonomers), and polyoxyethylene-polystyrene (POEPS). These resins have been successfully used for solid phase organic reactions in both aqueous and organic media. The PEG-based supports thus exhibit several advantages for application in solid-phase organic chemistry, solid-phase enzymatic reactions, and on-bead screening assays.

The PEG-based resins typically have been prepared by bulk polymerization. To obtain the appropriate particle size, the resins have been mechanically ground and sieved. However, the grinding process is labor intensive and tends to generate irregular particles as well as a considerable quantity of fines that have to be removed by sedimentation. Because irregular and fragile particles have limited use for applications such as on-bead screening assays, attempts have been made to prepare uniform beads of PEG-based resins.

Inverse suspension polymerization methods for producing beads from acrylic monomers are well established and can produce a higher yield of particles possessing uniform shape and size. For example, POEPS resin was prepared in beaded form by inverse suspension polymerization using water to generate stable emulsion droplets in a mixture of carbon tetrachloride and heptane. Water is, however, incompatible with the cationic and anionic ring-opening polymerization methods to prepare SPOCC and POEPOP polymers, respectively. In order to circumvent the problems of using dispersants that interfere with the cationic and anionic reactions, an entirely new suspension polymerization technique was developed based on the reaction of emulsions of the PEG macromonomers in silicone oil. Silicone oil is generally immiscible with organic compounds and can serve as an inert phase for suspension polymerization. Suspension polymerization in silicone oil has worked well on a one to two gram scale with short PEG monomers such as PEG 194 and PEG 400 chains. However, aggregation occurred when the process was scaled up or when longer PEG-monomers such as PEG 900 and PEG 1500 were used. As used herein, the number following the term "PEG" refers to the average molecular weight of the PEG polymer.

Improved methods are needed for preparing beads of PEG-based resins.

SUMMARY OF THE INVENTION

The invention relates to the synthesis of beaded polyethylene glycol-based resins in silicone oil in the presence of a polymeric surfactant containing a pentaalkyldisiloxane group.

One aspect of the invention provides a pentaalkyldisiloxane containing polymeric surfactant. The surfactant is the copolymerization product of n moles of an alkoxypolyoxyalkylenyl acrylate and m moles of a pentaalkyldisiloxane containing acrylate, wherein the molar ratio m:n ranges from about 1:100 to about 1:0.01. In some embodiments of the invention, the molar ratio m:n ranges from about 1:20 to about 1:4.

Another aspect of the invention provides a method for forming beaded resins by polymerization of macromolecules having a three, four, or five membered ring attached to one or both ends of a polyoxyalkylene. Polymerization of the macromonomers proceeds through an anionic or cationic ring opening reaction as the macromonomers are suspended in silicone oil in the presence of a pentaalkyldisiloxane containing polymeric surfactant.

The resins of the invention can be used, for example, as a support for solid phase organic synthesis, as a chromatographic resin, as a resin for solid phase MAS-NMR spectroscopy, and as a carrier for drug molecules, various reagents, or scavengers.

BRIEF DESCRIPTION OF THE DRAWING

FIG. 1 contains electron micrographs of three beaded PEG resins.

DETAILED DESCRIPTION OF THE INVENTION

The invention relates to the synthesis of beaded polyethylene glycol-based resins in silicone oil in the presence of a polymeric surfactant containing a pentaalkyldisiloxane group. In particular, the invention relates to a pentaalkyldisiloxane containing polymeric surfactant prepared by the copolymerization of several acrylate esters. The invention also relates to beaded resins formed by polymerization of macromolecules having a three, four, or five membered ring attached to one or both ends of a polyoxyalkylene. Polymerization of the macromonomers proceeds through an anionic or cationic ring opening reaction.

One aspect of the invention provides a pentaalkyldisiloxane containing polymeric surfactant formed by reacting an alkoxypolyoxyalkylenyl acrylate and an acrylate containing a pentaalkyldisiloxane group.

The alkoxypolyoxyalkylenyl acrylate is typically either an alkoxypolyoxyethylenyl acrylate of Formula I Formula I or an alkoxypolyoxypropylenyl acrylate of Formula II Formula II where $R_1$ is a ($C_1$ to $C_4$) alkyl, $R_2$ is a ($C_1$ to $C_4$) alkyl, and $n_{av}$ is an integer from about 2 to 30. As used herein, "$n_{av}$" refers to the average number of units of oxyalkylene in the polyoxyalkylene group. The alkoxypolyoxyalkylenyl acrylate is synthesized by reacting an unsubstituted or substituted acryloyl chloride with a monoalkyl ether of polyoxyethylene, polyoxypropylene, or a mixture thereof in the presence of a base. Suitable bases include pyridine, a trialkylamine such as triethylamine, and the like. The acryloyl chloride can be substituted, for example, with a ($C_1$ to $C_4$) alkyl. In one embodiment of the invention the alkoxypolyoxyalkylenyl acrylate is methyloxypolyoxyethylenyl methacrylate having an average molecular weight less than about 1500.

The pentaalkyldisiloxane containing acrylate is synthesized by reacting an unsubstituted or substituted acryloyl chloride with an alcohol containing a pentaalkyldisiloxane group. Suitable pentaalkyldisiloxane groups include pentamethyldisiloxane, pentaethyldisiloxane, pentapropyldisiloxane, and the like. The acryloyl chloride can be substituted, for example, with a ($C_1$ to $C_4$) alkyl. In some embodiments, trimethylsiloxy(dimethyl)silylpropanol is reacted with methacryloyl chloride to form trimethylsiloxy(dimethyl)silylpropyl methacrylate.

The surfactant is the copolymerization product of m moles of the alkoxypolyoxyalkylenyl acrylate and n moles of the pentaalkyldisiloxane containing acrylate, wherein the molar ratio m:n ranges from about 1:100 to about 1:0.01. In some embodiments of the invention, the molar ratio m:n ranges from about 1:20 to about 1:4.

One embodiment of the invention provides a surfactant synthesized by a two step process as shown in Scheme 1 that includes acylation of PEG 350 monomethylether with methacryloyl chloride in the presence of triethylamine to produce methyloxypolyoxyethylenyl methacrylate 2. This monomer is then copolymerized with trimethylsiloxydimethylsilyl-propyl methacrylate. The molar ratio of methyloxypolyoxyethylenyl methacrylate to trimethylsiloxydimethylsilylpropyl methacrylate is about 1:12. A pentamethyldisiloxane polymeric surfactant 1 is formed.

Scheme 1

Another aspect of the invention provides a method for preparing polymeric beads. A macromonomer is formed having an attached three, four, or five membered ring group on at least one end of a polyoxyalkylene. Droplets of the macromonomer are suspended in silicone oil in the presence of a polymeric surfactant containing a pentaalkyldisiloxane group. The resin beads are formed through an anionic or cationic ring opening reaction as shown in Scheme 2.

Scheme 2

The polyoxyalkylene typically has a linear structure and contains about 2 to about 300 oxyalkylene units. Suitable polyoxyalkylenes include polyoxyethylene, polyoxypropylene, and the like. The polyoxyalkylene can be attached to a branching unit such as, for example, $C(CH_3)(CH_2\text{—}O\text{—})_3$ providing a branched polyoxyalkylene and thus additional branching in the final polymer. The molecular weight of the polyoxyalkylene ranges from about 106 to about 13,000.

The polyoxyalkylene is alkylated by reaction with a compound containing a three, four, or five membered ring such that at least one of the end groups of the polyoxyalkylene contains a ring structure. A mixture of bis- and mono-alkylated polyoxyalkylene macromonomers is formed. The percentage of end groups that contain a ring structure affects the loading of the resulting polymeric bead. An increase in the percentage of macromonomer end groups containing a ring structure decreases the loading. Typically, about 60 to about 100 percent of the end groups contain a ring structure and the remaining macromonomer end groups are hydroxyl.

The three, four, or five membered ring groups include, for example, oxiranes, oxetanes, tetrahydrofurans, and mixtures thereof. The ring groups can be unsubstituted or substituted. In some embodiments of the invention, the ring is an unsubstituted or substituted oxirane such as an oxiranylmethyl group. A suitable substituted oxiranylmethyl group includes 2-halomethyl oxirane. In other embodiments of the invention, the ring is an unsubstituted or substituted oxetane such as a 3-methyloxetan-ylmethyl group. The 3-methyloxetan-ylmethyl group can be substituted with a halo, alkylsulfonyl, or arylsulfonyl group. Suitable substituted 3-methyloxetan-ylmethyl groups include, for example, 3-methyl-3-halomethyl oxetane, 3-methyl-3-alkylsulfonyloxymethyl oxetane, and 3-methyl-3-arylsulfonyloxymethyl oxetane.

Either an acid or a base can be used to catalyze the ring opening reaction. An acid catalyst can be used to open oxetane rings. Suitable acids include, for example, Lewis acids such as boron trifluoride ($BF_3$), trimethsilyl triflate (TMS-OTf), titanium tetrachloride ($TiCl_4$), zinc bromide ($ZnBr_2$), and the like. A base catalyst can be used to open oxirane rings. Suitable bases include, for example, an oxyanion, a thiolate, a metallated amine, an amide nucleophile, and the like. In some embodiments, the Lewis base is potassium tert-butoxide.

The length of the polyoxyalkylene used to prepare the macromonomers affects the size of molecules that can penetrate the resin beads. For example, beads prepared from PEG having a molecular weight of 1500 or larger are more suitable for enzymatic reactions than beads prepared from a lower molecular weight PEG such as PEG 400 or PEG 900.

Likewise, the extent of cross-linking affects the size of molecules that can penetrate the resin beads. Increasing the portion of the macromonomers that has a ring structure at both ends increases the extent of cross-linking. A resin with less cross linking can be penetrated more easily by large molecules such as enzymes than a resin with high cross-linking.

Resin beads having a uniform, spherical shape can be prepared using the methods of the invention. The average bead size depends, for example, on variables such as the amount of surfactant, the stirring rate during the polymerization reaction, the type and amount of solvent added to dissolve the macromonomer, and the reaction temperature. The particle size can be controlled in the range of 0.01 to 5 mm. Typically, the particle size distribution is no greater than about 40 percent of the average particle size. In some embodiments, the variance is about 25%.

The polymeric beads have a loading from about 0.1 to about 1.2 mmol/g and a swelling from about 2.5 to about 50 ml/g depending on the solvent.

The most frequently used resins for solid phase synthesis have swelled particle sizes ranging from about 40 to about 200 μm and a loading on the order of from about 10 to about 600 pmol per bead. For applications in which a higher loading per bead is preferred, beads having a swelled size range of about 300 to about 750 μm are preferred. For example, to monitor the reaction on a single bead by magic angle spinning (MAS) $^1H$ NMR spectroscopy, larger beads are preferred.

In one embodiment of the invention shown schematically in Scheme 3, a method is provided to prepare a beaded SPOCC resin using a cationic polymerization reaction.

Scheme 3

A mixture of bis- and mono-oxetanylated PEG macromonomers are formed by alkylation of a PEG having an average molecular weight between 300 and 13,000. The variance for the PEG molecular weight distribution can be as much as 50% of the average molecular weight. The PEG hydroxyl groups are deprotonated/metallated in the presence of a strong base such as sodium hydride (NaH) or potassium hexamethyldisilazane. The resulting deprotonated/metallated groups are alkylated with an oxetane compound such as, for example, 3-methyl-3-halomethyl oxetane, 3-methyl-3-alkylsulfonyloxymethyl oxetane, or 3-methyl-3-arylsulfonyloxymethyl oxetane. The macromonomers are dissolved in a polar solvent such as acetonitrile, tetrahydrofuran, a halogenated solvent, or the like. A polymeric surfactant containing a pentaalkyldisiloxane group is added to the macromonomer solution along with a Lewis acid catalyst such as $BF_3$. The resulting mixture is suspended as droplets in silicone oil within a stirred polymerization vessel. The cationic polymerization reaction is carried out at an appropriate temperature ranging from about −50° C. to about 200° C. and uniform beads are formed. The resulting beaded polymers are filtered and washed to remove the silicone oil and surfactant. The washed beads are typically boiled in a strong acid solution such as 4M hydrochloric acid, a strong base solution such as 4M potassium hydroxide, or both a strong acid and a strong base. Any residual acid or base is removed by washing with water. Finally, the washed beads are dried.

The surfactant level is typically less than about 100 mg per gram of macromonomer. Higher surfactant levels tend to result in the formation of irregular shaped particles that are smaller than about 300 μm. The lower level of surfactant that can be used to prepare beaded resin is limited by the amount of surfactant needed to produce a stable emulsion. The surfactant level is typically greater than about 10 mg per gram of macromonomer. In some embodiments of the invention, the surfactant level is from about 20 and 50 mg of surfactant per gram of macromonomer. The bead size distribution generally increases with decreasing surfactant levels.

Suitable solvents for the dissolution of the macromonomers that undergo cationic polymerization include acetonitrile (MeCN), dichloromethane (DCM), dichloroethane (DCE), and the like. The solvent preferably remains a liquid at the low temperature used to control the initiation of the cationic-ring opening polymerization reaction. The amount of solvent influences the average bead size and is typically in the range of about 0.5 to about 3 ml per gram of macromonomer. Reducing the amount of solvent tends to increase the average bead size.

The stirring rate during polymerization can influence the bead size. The bead size tends to decrease with increased stirring rates. The resin beads can be prepared using a high density of macromonomers droplets in the suspension medium. In one embodiment of the invention, the ratio of silicon oil to macromonomer solution is about 3:1.

The beaded resin batches are washed extensively with a solvent such as dichloromethane to remove silicone oil and surfactant, followed by washing with solvents such as methanol and water to remove unreacted macromonomers. To open any remaining ring structures, the beads can be treated with a strong acid such as hydrochloric acid or a strong base such as hot 4M NaOH. The treatment with 4M NaOH also destroys any products formed from a transesterification reaction between a deprotonated alcohol and esters of the surfactant during the polymerization.

Beads can be obtained in high yields of 70–90% using the methods of the invention. The surfactant does not interfere with the polymerization and can be removed together with residual silicone oil by a simple washing procedure. Because the silicone oil can be recovered by filtration at the end of polymerization and reused, this process is viable for large-scale polymer production.

In another embodiment of the invention shown schematically in Scheme 4, a method is provided to prepare a beaded POEPOP resin through an anionic polymerization reaction.

Scheme 4

$n_{av}$ = 3-300, e.g. PEG 1500

POEPOP

A mixture of bis- and mono-oxiranylated PEG macromonomers are formed by alkylation of a PEG having an average molecular weight between about 300 and about 13,000. The variance for the PEG molecular weight distribution can be as much as 50% of the average molecular weight. The PEG hydroxyl groups are deprotonated/metallated with a strong base such as sodium hydride (NaH), potassium hexamethylsisilazane, or phosphazanes and alkylated with 2-halomethyl oxirane. The macromonomers are dissolved in a solvent such as tert-butanol. A polymeric surfactant containing a pentaalkyldisiloxane group is added to the macromonomer solution along with a base catalyst such as potassium tert-butoxide. The resulting mixture is suspended as droplets in silicone oil within a stirred polymerization vessel. The polymerization reaction is carried out at an appropriate temperature ranging from about −50° C. to about 200° C. and uniform beads are formed. The beaded polymers are filtered and washed to remove the silicone oil and surfactant. The washed beads are typically boiled in a strong acid solution such as 4M hydrochloric acid solution, a strong base solution such as 4M potassium hydroxide, or both a strong acid and a strong base. The beads are then washed with water and dried.

With a base catalyzed ring opening polymerization reaction, the preferred solvent is tert-butanol. Small amounts of 1,2-dichloroethane, tetrahydrofuran or acetonitrile solvents tend to inhibit the polymerization reaction. Evaporation of the solvent before polymerization results in beads with a larger size distribution due to increased viscosity of the reaction mixture.

The average bead size for resins prepared by anionic polymerization can be controlled by varying the stirring rate, the amount of solvent used to dissolve the macromonomers, the temperature, and the amount of surfactant. Increasing the stirring rate tends to result in the formation of smaller beads. Increasing the temperature, the amount of solvent, or the amount of surfactant tends to decrease bead size.

The PEG-based resins of the invention swell in a broad range of solvents. They tend to swell best in methylene chloride, somewhat less in dimethylformamide and water, and much less in tetrahydrofuran and acetonitrile. The swelling is comparable to that of material obtained by bulk polymerization.

The SPOCC and the POEPOP resins have hydroxyl group loadings between about 0.1 and 1.2 mmol/g of polymer. In one embodiment, the resins have a loading in the range of about 0.49 to about 0.53 mmol/g. The resins of the invention can have a loading comparable to that of material obtained by bulk polymerization.

Another aspect of the invention provides beaded resins prepared according the above methods.

The beaded resins of the invention can be used as supports for organic solid phase synthesis. The resins typically are chemically inert to a broad range of reaction conditions, mechanically stable, and compatible with a range of solvents having different polarity.

The resins have good swelling characteristics in water and can be used for enzymatic reactions or enzymatic assays. The beads can be used, for example, to prepare fluorescent quenched solid phase combinatorial libraries for the characterization of a protease substrate such as cysteine protease as described by P. M. St.Hilaire, M. Willert, M. A. Juliano, L. Juliano, and M. Meldal in *J.Comb.Chem*, 1:509–523 (1999). The beads can also be used for a "one bead two compounds" enzyme inhibitor library assay. J. Buchardt, C. B. Schiødt, C. Krog-Jensen, J.-M. Delaisse, N. T. Foged, and M. Meldal in *J.Comb.Chem.*, 2:624–638 (2000) used this approach to prepare a solid phase combinatorial library of phosphinic peptides for discovery of matrix metalloproteinase inhibitors.

The beaded resins are particularly advantageous for combinatorial chemistry. Such techniques can be used to produce large libraries of molecularly diverse compounds. Solid phase supports simplify product isolation and allow the use of excess reagents to drive the various reactions to completion. Each bead can carry a different compound. The synthesized compounds can be analyzed while still attached to the resin bead using various spectroscopic techniques such as, for example, magic angle spinning $H^1$ NMR.

The beaded polymers can be used as chromatographic resins in a wide range of different solvents to separate molecules based on size or other characteristics such as polarity. The beads can also be modified with affinity ligands for affinity chromatography. Example of affinity ligands include specific reversible enzyme inhibitors for enzymes present in low amounts in biological fluids such as the phosphinic peptide LMFG($\Psi PO_2CH_2$)LYLS for the isolation of metalloproteases or glycopeptides such as HLLT (Neu5Ac)WGH for the isolation of sialoadhesins.

Hydroxyl groups of the beaded polymer can be chemically modified for use as reagent or scavenger resins for synthesis. For example, hydroxyl groups can be converted to amines via an azide. Amine groups can be converted to an isothiocyanate using thiophosgene. Hydroxyl groups can be oxidized to an aldehyde using Des Martin reagent or to the carboxylic acid using Jones reagent.

The beaded polymers can serve as a carrier for drugs. Thus a peptide with a proteolytic cleavage site can be used to link a toxic substance to the support. The drug will release only when a tissue specific protease characteristic for the diseased tissue such as a tumor is present. In addition to the drug, the beads can also carry a molecule targeted for a specific receptor on that tissue leading to adherence of the beads carrying the drug on the surface of the tissue.

The following examples further describe the invention. The examples are provided for exemplary purposes to facilitate understanding of the invention and should not be construed to limit the invention to the examples.

EXAMPLES

All solvents were purchased from Labscan Ltd. (Dublin, Ireland) and stored over molecular sieves. Methacryloyl chloride and PEG 350 monomethyl ether and PEG 1500 were purchased from Fluka (Buchs, Switzerland). Trimethylsiloxydimethylsilylpropyl methacrylate was purchased from ABCR (Karlsruhe, Germany).

Example 1

Preparation of Pentamethyldisiloxane Polymeric Surfactant

Methyloxypolyoxyethylenyl methacrylate was synthesized by adding methacryloyl chloride (0.67 ml, 5.9 mmol) dropwise to a solution of PEG 350 monomethylether (2.0 g, 5.7 mmol) and triethylamine (1.7 ml, 12.2 mmol) at 0° C. Moisture was excluded. The reaction mixture was stirred for 5 hours, filtered, and evaporated in vacuum to remove the solvent. The resulting pale white/yellow oil was used without further purification. $^1$H NMR, 250 MHz, $\delta(CDCl_3)$: 6.3 (1H, m), 5.9 (1H, m), 4.45 (2H, m), 3.81 (1H, m), 3.59–3.34 (32H, m), 3.25 (3H, m) and 1.82 (3H, s) ppm. $^{13}$C NMR, $\delta(CDCl_3)$: 167.20, 137.20, 124.10, 72.26, 70.80, 70.92, 68.80, 58.81, and 17.20 ppm.

Trimethylsiloxydimethylsilylpropyl methacrylate (4.0 ml, 13.1 mmol) and methyloxypolyoxyethylenyl methacrylate (0.6 g, 1.44 mmol) were dissolved in degassed chloroform (10 ml). Azoisobutyronitrile (AIBN) (60 mg, 0.37 mmol) was added and the reaction vial was sealed and heated at 60° C. for 48 hours. The reaction mixture was diluted with chloroform (50 ml) and washed with 0.1M aqueous sodium bicarbonate (2×50 ml). The organic layer was separated, dried over magnesium sulfate, and filtered. The solvent was removed by evaporation in a vacuum. The resulting yellow paste was dried under high vacuum and used without any further treatment. Nanoprobe MAS $^1$H NMR, 500 MHz, δ(CDCl$_3$): 3.91 (2.6 H, m, CO$_2$C$\underline{H}_2$CH$_2$), 3.79–3.55 (2.2 H, m, [C$\underline{H_2CH_2O}$]$_8$), 3.40 (0.2H, s O$\underline{CH_3}$), 1.93 (2.5 H, m, CH$_2$C$\underline{H_2}$CH$_2$), 1.1 (1.4 H, m,C$\underline{CH_2}$C), 0.95 (3 H, m, C$\underline{H_3}$CH), 0.65 (2 H, m, CHC$\underline{H_2}$Si) and 0.05 (15 H, m, CH$_2$Si(C$\underline{H_3}$)$_2$OSi(C$\underline{H_3}$)$_2$) ppm.

Example 2

Preparation of Beaded SPOCC Resin
Preparation of (3-methyloxetan-3-yl)methyl 4-toluenesulfonate 4-Toluenesulfonyl chloride (20 g, 105 mmol) was dissolved in a mixture of dichloromethane (DCM) (50 ml) and pyridine (50 ml) and cooled in an ice bath. 3-(hydroxymethyl)-3-methyloxetane (100 mmol, 9.9 mL) was added dropwise. The temperature was increased to 20° C. overnight. The solution was diluted with DCM (100 mL) and extracted with water. The organic phase was dried over magnesium sulfate and filtered. The volatile solvents were removed by evaporation. The remaining material was concentrated several times with toluene to remove the residual pyridine and then with chloroform to remove the residual toluene. Yield: 22 g of a white crystalline solid (92%). TLC: R$_f$(petroleum ether/ethyl acetate, 1:1) 0.56.

Preparation of 3-bromomethyl-3-methyloxetane 3-(Methyl-oxetan-3-yl)-methanol (49.7 g, 0.475 mol, 1 eq.), triphenylphosphine (155.9 g, 0.594 mol, 1.2 eq.) and pyridine (96 mL, 1.19 mol, 2.5 eq.) were dissolved in dry CH$_2$Cl$_2$ (400 mL) under argon and cooled on ice. Bromine (76.1 g, 0.476 mole, 1 eq.) dissolved in CH$_2$Cl$_2$ (25 mL) was added dropwise and after complete addition it was stirred at room temperature for 1 hour. The crude produce was concentrated in vacuo and the solid residue was extracted with diethyl ether (500 mL). The extract was washed with 1$\underline{M}$ Na$_2$CO$_3$ (250 mL of the aqueous solution) and water (250 mL). The organic phase was dried (Na$_2$SO$_4$), filtered and concentrated in vacuo. Vacuum distillation afforded the title product (54.1 g, 69% yield) at 59–61° C.

Preparation of 3-methyloxetanylmethyl PEG 1500 Macromonomers

PEG 1500 (10 mmol) was dried by removal of water through coevaporation with toluene and then dissolved in a 1:1 toluene/dimethyl formamide (DMF) solution (30 mL). With stirring, potassium hexamethyldisilazane (KHMDS) (22 mmol) was added at room temperature to deprotonate/metallate the hydroxyl groups. After 15 minutes, the volatiles were removed using a rotary evaporator in a 50° C. water bath. The residue was dissolved in DMF (15 mL) and treated with portions of either (3-methyloxetan-3-yl)methyl 4-toluenesulfonate or 3-bromomethyl-3-methyloxetane (24 mmol) at room temperature. The mixture was heated for 12 hours at 75° C. After cooling to ambient temperature, any unreacted alkylating agent was removed by stirring the mixture for 15 minutes with water (2 mL). The solvents were removed at 40° C. under reduced pressure. The remaining slurry was resuspended in DCM (10 mL) and then filtered on a fritted glass filter through a 2 cm layer of Celite™ (available from World Minerals, Inc.; Santa Barbara, Calif.) that had been prewetted with DCM and compressed. The residue on the filter was washed with DCM (50 mL). After evaporation of any remaining solvent, the yield was 90%. NMR spectroscopy results indicated that about 90–100% of the PEG end groups were alkylated with oxetane rings.

Suspension Polymerization of SPOCC

The pentamethyldisiloxane polymeric surfactant from Example 1 was dissolved in various solvents as shown in Table 1. The solvents included dichloromethane (DCM), dichloroethane (DCE), acetonitrile (MeCN), and di-methyltriethylene glycol ether (DMTG). The surfactant solutions were mixed with the 3-methyloxetanylmethyl PEG 1500 macromonomers. The amount of macromonomer, the ratio of surfactant to macromonomer, and the amount of solvent were varied as shown in Table 1.

After a homogeneous solution of the macromonomer, surfactant, and solvent was obtained, the solution was cooled in an ice bath and BF$_3$OEt$_2$ (0.1 ml/g macromonomer) was added with stirring and with the exclusion of moisture. After 2 minutes, the mixture was added to silicone oil (20 ml/g macromonomer) at room temperature. The stirring rate is shown in Table 1. After 2 hours of stirring at room temperature, the temperature was increased to 60° C. and the polymerization reaction was allowed to continue overnight without stirring. The resulting polymeric beads were filtered on a sintered glass funnel and the silicone oil collected for recycling.

The beads were washed with dichloromethane, dimethyl formamide, methanol and water (3×5 ml/g macromonomer for each solvent) followed by a treatment with 4$\underline{M}$ HCl (8 ml/g macromonomer) for 2 hours at 60° C. The treated beads were washed extensively with water, methanol, dimethyl formamide and dichloromethane (3×5 ml/g macromonomer for each solvent). The beads were dried under high vacuum for 24 hours and sieved through the following sieves: 1000 μm, 500 μm, 300 μm (see Table 1). Nanoprobe $^1$H NMR spectroscopy showed no traces of remaining silicone containing compounds in any of the resins.

TABLE 1

Suspension polymerization of SPOCC monomers.[a]

| Resin | Monomer g | Surfactant mg/g monomer | Solvent ml | Stirring rpm | Size distribution of dry beads, μm[b] | | | | Yield %[c] |
|---|---|---|---|---|---|---|---|---|---|
| | | | | | % >1000 | % >500 | % >300 | % <300 | |
| 2-1 | 2 | 100 | DCM 2 | 300 | — | — | — | 100 | 73 |
| 2-2 | 2 | 50 | DCM 2 | 300 | — | — | — | 100 | 68 |
| 2-3 | 2 | 25 | DCM 2 | 300 | — | — | — | 100 | 71 |

TABLE 1-continued

Suspension polymerization of SPOCC monomers.[a]

| Resin | Monomer g | Surfactant mg/g monomer | Solvent ml | Stirring rpm | Size distribution of dry beads, μm[b] | | | | Yield %[c] |
|---|---|---|---|---|---|---|---|---|---|
| | | | | | % >1000 | % >500 | % >300 | % <300 | |
| 2-4 | 2 | 12.5 | DCM 2 | 300 | — | — | — | 100 | 27 |
| 2-5 | 2 | 25 | DCE 2 | 200 | — | 6.7 | 73.3 | 20 | 75 |
| 2-6 | 2 | 25 | MeCN 2 | 200 | — | 20 | 66.7 | 13.3 | 75 |
| 2-7 | 2 | 25 | DMTG 2 | 200 | — | — | — | — | — |
| 2-8 | 4 | 25 | DCM 4 | | — | — | — | 100 | 78 |
| 2-9 | 4 | 25 | DCM 2.4 | 200 | — | 13 | 58 | 29 | 78 |
| 2-10 | 4 | 25 | DCM 1.5 | 200 | 13 | 72 | 15 | — | 80 |
| 2-11 | 4 | 25 | DCM 1.5 | 100 | 72 | 28 | — | — | 80 |
| 2-12 | 4 | 25 | DCM 1.5 | 300 | 1.5 | 11.9 | 77.6 | 9 | 84 |
| 2-13 | 20 | 25 | DCM 7.5 | 300 | — | 20 | 74 | 6 | 89 |

[a]In all entries 50 μl of BF$_3$OEt$_2$/g macromonomer and 20 ml of silicone oil/g macromonomer was used.
[b]Determined by weight after sieving.
[c]Determined after sieving.

Table 1 shows the particle size distribution obtained after sieving the beads. The column labeled %<300 shows the weight percent of the beads that had a particle size that was smaller than 300 μm. The column labeled %>300 shows the weight percent of the beads that had a particle size greater than 300 μm but less than 500 μm. The column labeled %>500 shows the weight percent of the beads that had a particle size greater than 500 μm but less than 1000 μm. Finally, the column labeled %>1000 shows the weight percent of the beads that had a particle size greater than 1000 μm.

Small beads with a diameter of less than 50 μm resulted from the use of 100 mg of surfactant/g macromonomer. Small, irregular particles were produced with the use of higher amounts of surfactant. Stable emulsions were achieved using 25 and 50 mg of surfactant/g macromonomer. The bead size distribution increased with decreasing amount of surfactant, typically in the range of about 100 to 300 μm for 25 mg of surfactant/g macromonomer and about 50 to 200 μm for 50 mg of surfactant/g macromonomer. A significant amount of aggregation was observed when the amount of surfactant was reduced to 12.5 mg/g macromonomer, indicating the lower limit for formation of stable emulsions.

Acetonitrile, dichloromethane, and dichloroethane were suitable solvents. On the other hand, di-methyl-triethylene glycol ether solidified at the lower temperatures needed to control the initiation of the cationic ring-opening polymerization and was not a suitable solvent.

The amount of solvent used in the cationic ring-opening polymerization affected the bead-size distribution. For example, 1 ml of dichloromethane per gram of macromonomer gave a bead size of less than 300 μm when stirred at 200 rpm. Reducing the amount of dichloromethane to 0.6 ml/g macromonomer produced larger beads having diameters between 300 and 500 μm. Continued reduction of the volume of dichloromethane to 0.38 ml/g macromonomer resulted mainly in beads larger the 500 μm.

The stirring rate also had a significant influence on the bead size. The bead size tended to decrease with stirring rate.

Figure 1A:
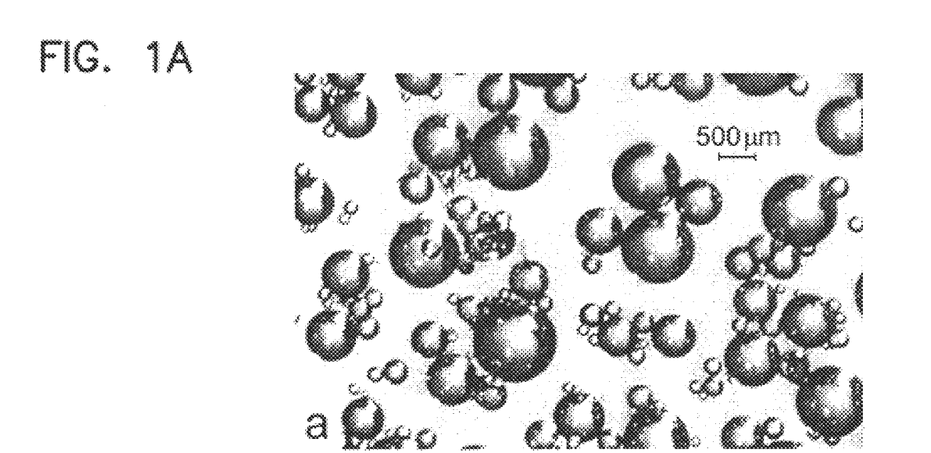
Figure 1B:
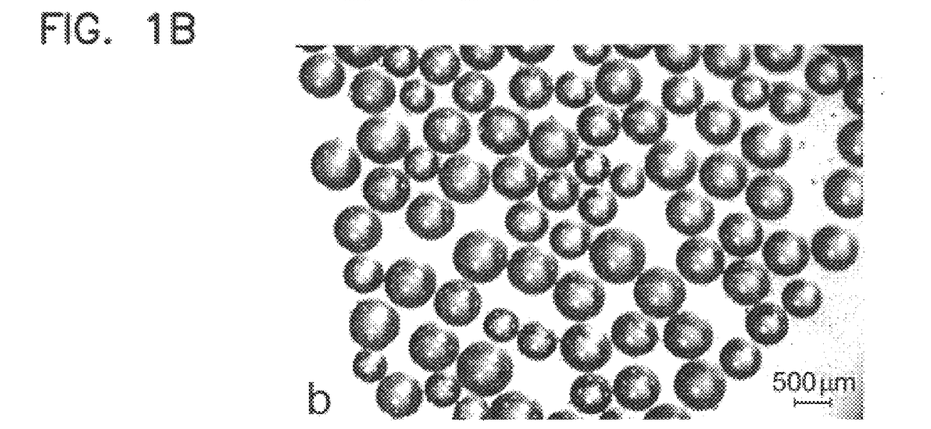
Figure 1C:
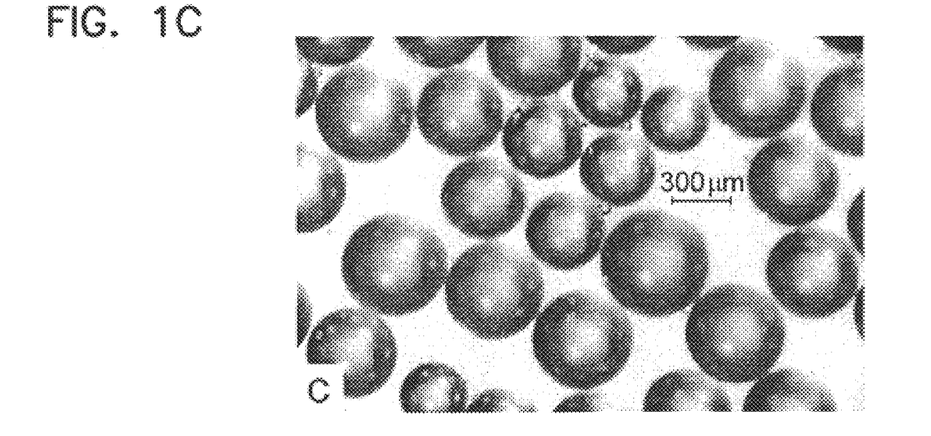

Using 25 mg of surfactant, 0.38 ml dichloromethane/g macromonomer, and a stirring rate of 300 rpm, a 20 g batch of SPOCC 1500 was produced. The electron micrograph for resin Example 2–13 is shown in FIG. 1c. The procedure works equally well for preparing 1 gram or 20 grams of polymeric material.

Example 3

Preparation of Beaded POEPOP Resin
Preparation of methyloxirane PEG 1500 Macromonomers PEG 1500 (5 g, 6.6 mmol) was dissolved in dry tetrahydrofuran (THF) (5 mL). Sodium hydride (55% NaH in oil) (0.15 g, 3.9 mmol) was added and the mixture was stirred for 6 hours. Epichlorohydrin (0.32 mL, 3.9 mmol) was added to the reaction mixture at 45° C. and the mixture was stirred for 16 hours. The product was precipitated using diethyl ether and filtered off. The precipitated product was dissolved in dichloromethane and filtered to remove insoluble impurities. The product was precipitated a second time using diethyl ether, filtered, and dried under high vacuum. The yield was 90% (4.5 g).

Suspension Polymerization of POEPOP

Initially, anionic ring opening polymerization of methyloxirane PEG 1500 macromonomers was performed by adding solid potassium tert-butoxide to a melted mixture of macromonomers and the pentamethyldisiloxane polymeric surfactant prepared in Example 1. The reaction mixture was added to silicone oil at 120° C. while stirring. The mixture was inhomogeneous and resulted in beads exhibiting a large variation in size and quality.

Small amounts of 1,2-dichloroethane, tetrahydrofuran or acetonitrile solvents were examined to improve the homogeneity of the mixture. However, these solvents inhibited the polymerization and no useful material was formed. Suitable polymeric beads could be prepared using tert-butanol as the solvent.

A solution of potassium tert-butoxide (50 mg/g macromonomer) catalyst in tert-butanol was mixed with the methyloxirane PEG 1500 macromonomers at 40° C. and stirred for 10 min. A solution of the pentamethyldisiloxane polymeric surfactant prepared in Example 1 in tert-butanol (0.1 ml/50 mg of surfactant) was prepared and added to the macromonomer/catalyst solution.

The solvent was evaporated in vacuum at 50° C. for Examples 3-2, 3-3, 3-4. and 3-6. The solvent was not removed for Examples 3-1, 3-5, and 3-6. The residue or solution was added to silicone oil (20 ml/g macromonomer) at 120° C. with stirring. The stirring rates are shown in Table 2. After stirring at 120° C. for 12 hours, the beads were washed with dichloromethane, dimethyl formamide, methanol and water (3×5 ml/g macromonomer for each solvent). Dichloromethane was used to remove silicone oil and surfactant. Washing with methanol and water removed unreacted macromonomers. After washing, the beads were treated with 4$\underline{M}$ NaOH for 2 hours at 60° C. to destroy any products formed from transesterification reaction between a deprotonated alcohol and esters of the surfactant during the polymerization. The treated beads were washed extensively with water, methanol, dimethyl formamide and dichloromethane (3×5 ml/g macromonomer for each solvent). The beads were dried under high vacuum for 24 h and sieved through the following sieves: 1000 $\mu$m, 500 $\mu$m, 300 $\mu$m (see Table 2). Nanoprobe $^1$H NMR spectroscopy showed no traces of remaining silicone containing compounds in any of the resins.

As shown in Table 2, beads with a narrow size distribution were prepared using tert-butanol as the solvent. However, evaporation of the tert-butanol before polymerization resulted in beads with a larger size distribution due to increased viscosity of the reaction mixture.

large scale (Example 3–6). However, high quality beads were obtained (FIG. 1b). The meaning of the column headings describing the bead size distribution is the same as in Table 1 above.

Experiment 4

Determination of Swelling and Loading of Resin Beads

The quantity of hydroxyl groups available for substrate attachment to the resins (loading) was determined by esterification with 9-fluorenylmethyoxycarbonyl glycine (Fmoc-Gly) activated by 2,4,6-mesitylenesulfonyl-3-nitro-1,2,4-triazolide (MSNT) in the presence of N-methyl imidazole in dichloromethane. A weighed polymer sample was treated with 20% piperidine in DMF. The UV-absorbency of the adduct of dibenzofulvene and piperidine was measured and compared to a standard curve to determine loading.

Swelling was determined using the syringe technique. A weighed amount of the resin was placed in a syringe barrel having a sintered Teflon filter. A flow of solvent was passed through the syringe. The volume of the resin bed was measured. The excess solvent was then drained from the syringe by placing a 4.5 kg (10 lb.) weight on the inserted syringe piston (diameter 1.25 cm, 0.5 inch). The weight was removed, the resin was allowed to expand, and the value measured was used to calculate the swelling.

TABLE 2

Suspension polymerization of POEPOP monomers.[a]

| Resin | Monomer g | Surfactant mg/g monomer | Solvent ml | Stirring rpm | Size distribution of dry beads, $\mu$m[c] | | | | Yield %[d] |
|---|---|---|---|---|---|---|---|---|---|
| | | | | | % >1000 | % >500 | % >300 | % <300 | |
| 3-1 | 1 | 25 | tBuOH 0.38 | 100 | — | 76 | 24 | — | 79 |
| 3-2 | 1 | 25 | tBuOH 2[b] | 100 | 85 | 15 | — | — | 77 |
| 3-3 | 5 | 25 | tBuOH 5[b] | 200 | 26 | 68 | 8 | — | 81 |
| 3-4 | 5 | 25 | tBuOH 5[b] | 300 | 0.3 | 75 | 24 | 0.7 | 88 |
| 3-5 | 5 | 25 | tBuOH 5 | 300 | — | — | — | 100 | 70 |
| 3-6 | 61 | 25 | tBuOH 35[b] | 300 | 27 | 49 | 17 | 7 | 84 |

[a]In all entries 50 mg of tBuOK/g macromonomer and 20 ml of silicone oil/g macromonomer was used.
[b]The tBuOH was evaporated in vacuo before polymerization.
[c]Determined by weight after sieving.
[d]Determined after sieving.

The affect of stirring rate was investigated (Example 3-2, 3-3, and 3-4). Stirring at 100 rpm and 200 rpm resulted in beads with a diameter above 1000 $\mu$m and between 500–1000 $\mu$m, respectively. Increasing the stirring speed to 300 rpm resulted in a 3:1 ratio of beads between 1000–500 $\mu$m and 500–300 $\mu$m (Example 3–4; FIG. 1a). Stirring at 300 rpm gave a larger size distribution when carried out on a

TABLE 3

Swelling and loading of resin beads

| Resin | Bead size µm | Swelling | | | | | Loading mmol/g |
|---|---|---|---|---|---|---|---|
| | | THF ml/g | MeCN ml/g | DMF ml/g | Water ml/g | DCM ml/g | |
| 2-1 | 300> | 7.4 | 6.8 | 8.7 | 8.4 | 11.6 | 0.51 |
| 2-2 | 300> | 7.3 | 6.7 | 8.7 | 8.5 | 11.7 | 0.50 |
| 2-3 | 300> | 7.3 | 6.8 | 8.8 | 8.4 | 11.6 | 0.49 |
| 2-4 | 300> | 7.3 | 6.7 | 8.7 | 8.4 | 11.6 | 0.50 |
| 2-5 | >300 | 7.4 | 6.8 | 8.8 | 8.5 | 11.7 | 0.51 |
| 2-6 | >300 | 7.5 | 6.9 | 8.8 | 8.5 | 11.7 | 0.51 |
| 2-8 | 300> | 7.3 | 6.7 | 8.7 | 8.4 | 11.6 | 0.52 |
| 2-9 | >300 | 7.4 | 6.8 | 8.8 | 8.5 | 11.8 | 0.50 |
| 2-10 | >500 | 7.5 | 6.9 | 8.9 | 8.6 | 11.8 | 0.49 |
| 2-11 | >1000 | 7.7 | 7.1 | 9.0 | 8.7 | 11.9 | 0.50 |
| 2-12 | >300 | 7.4 | 6.7 | 8.8 | 8.5 | 11.7 | 0.49 |
| 2-13 | >300 | 7.4 | 6.8 | 8.8 | 8.6 | 11.8 | 0.51 |
| 3-1 | >500 | 7.6 | 8.0 | 8.4 | 7.9 | 10.0 | 0.52 |
| 3-2 | >1000 | 7.8 | 8.2 | 8.6 | 8.1 | 10.2 | 0.51 |
| 3-3 | >500 | 7.6 | 8.0 | 8.5 | 8.0 | 10.1 | 0.53 |
| 3-4 | >500 | 7.5 | 8.0 | 8.4 | 8.0 | 10.0 | 0.50 |
| 3-5 | 300> | 7.4 | 7.9 | 8.3 | 7.8 | 9.9 | 0.51 |
| 3-6 | >500 | 7.5 | 8.1 | 8.4 | 7.9 | 10.1 | 0.52 |

The resins swelled best in $CH_2Cl_2$, some what less in DMF and water, and much less in THF and MeCN. The small difference in swelling between small and large beads was probably due to different packing characteristics. The swelling is comparable to that of resin prepared by bulk polymerization.

The SPOCC and the POEPOP resins exhibited loadings from 0.49 to 0.53 mmol/g. The loadings are comparable to that of resin prepared by bulk polymerization.

We claim:

1. A method for preparing polymeric beads comprising;
   (a) forming a macromonomer having an attached three, four, or five membered ring group on at least one end of a polyoxyalkylene;
   (b) suspending droplets of the macromonomer in silicone oil in the presence of a surfactant containing a pentaalkyldisiloxane group; and
   (b) forming a polymer through an acid or base catalyzed ring opening reaction.

2. The method of claim 1, wherein the ring group is selected from the group consisting of unsubstituted or substituted oxirane, unsubstituted or substituted oxetane, unsubstituted or substituted tetrahydrofuran, and mixtures thereof.

3. The method of claim 1, wherein the ring group is an unsubstituted or substituted 3-methyloxetan-ylmethyl group.

4. The method of claim 3, wherein the 3-methyloxetan-ylmethyl group is substituted with a halo, alkylsulfonyl, or arylsufonyl group.

5. The method of claim 1, wherein the ring group is an oxiranylmethyl group.

6. The method of claim 1, wherein the macromonomer is a polyoxyethylene with from 60 to 100 percent of the end groups having a ring structure.

7. The method of claim 1, wherein the surfactant comprises the copolymerization product of:
   (a) an alkoxypolyoxyalkylenyl acrylate; and
   (b) an acrylate containing a pentaalkyldisiloxane group.

8. The method of claim 7, wherein the alkoxypolyoxyalkylenyl acrylate is formed by the reaction of unsubstituted or substituted acryloyl chloride with a monoalkylpolyethylene glycol.

9. The method of claim 7, wherein the acrylate containing a pentaalkyldisiloxane group is formed by the reaction of unsubstituted or substituted acryloyl chloride with trimethylsiloxy(dimethyl) silylpropanol.

10. The method of claim 1, wherein the catalyst is a Lewis acid or a base.

11. The method of claim 10, wherein the Lewis acid is selected from the group consisting of boron trifluoride ($BF_3$), trimethylsilyl triflate (TMS-OTf), titanium tetrachloride ($TiCl_4$), and zinc bromide ($ZnBr_2$).

12. The method of claim 10, wherein the base is selected from the group consisting of an oxyanion, a thiolate, a metallated amine, and an amide nucleophile.

13. The method of claim 12, wherein the base is potassium tert-butoxide.

14. The method of claim 1, wherein the surfactant is present in an amount of at least 10 mg/g of macromonomer and no more than about 100 mg/g of macromonomer.

15. The method of claim 14, wherein the surfactant is present in an amount of at least 20 mg/g of macromonomer and no more than about 50 mg/g of macromonomer.

16. The method of claim 1, wherein the macromonomer droplets comprise a solvent in an amount of about 0.5 to 3 ml/g solvent/macromonomer.

17. The method of claim 1, wherein the macromomomer droplets comprise acetonitrile, dichloromethane, or dichloroethane as a solvent.

18. The method of claim 1, wherein the ratio of silicon oil to macromonomer solution is about 3:1.

19. The method of claim 1, wherein the macromonomer is polyethylene glycol having an average molecular weight of from about 300 to about 13,000.

20. Polymeric beads produced by the method of claim 1.

21. The method of claim 1, further comprising attaching an affinity ligand to the polymer.

22. The method of claim 1, further comprising converting an hydroxyl group to a functional group.

23. The method of claim 22, additionally comprising the step of selecting an amine as the functional group.

24. The method of claim 22, additionally comprising the step of selecting an aldehyde as the functional group.

25. The method of claim 22, additionally comprising the step of selecting a carboxylic acid as the functional group.

26. The method of claim 22, additionally comprising the step of selecting an isothiocyanate as the functional group.

27. The method of claim 1, further comprising attaching a drug to the polymer.

* * * * *